(12) United States Patent
Rabofsky et al.

(10) Patent No.: US 12,741,492 B2
(45) Date of Patent: Sep. 22, 2026

(54) TOW HOOK DEVICE

(71) Applicant: MAGNA STEYR Fahrzeugtechnik GmbH & Co KG, Graz (AT)

(72) Inventors: Alexander Rabofsky, Graz (AT); Ales Horvat, Ptuj (SI); Hans-Peter Kuttner, Lieboch (AT); Silke Ortner, Gratwein-Strassengel (AT)

(73) Assignee: MAGNA STEYR Fahrzeugtechnik GmbH & Co KG, Graz (AT)

( * ) Notice: Subject to any disclaimer, the term of this patent is extended or adjusted under 35 U.S.C. 154(b) by 341 days.

(21) Appl. No.: 18/424,808

(22) Filed: Jan. 28, 2024

(65) Prior Publication Data

US 2025/0242641 A1 Jul. 31, 2025

(30) Foreign Application Priority Data

Mar. 9, 2023 (DE) ......................... 102023202106.4

(51) Int. Cl.
*B60D 1/04* (2006.01)
*B60D 1/48* (2006.01)

(52) U.S. Cl.
CPC ............... *B60D 1/04* (2013.01); *B60D 1/488* (2013.01)

(58) Field of Classification Search
CPC .......... B60D 1/04; B60D 1/488; B60D 1/565; B60D 1/14; B60D 1/24
See application file for complete search history.

(56) References Cited

U.S. PATENT DOCUMENTS

2019/0241033 A1* 8/2019 Takahashi .............. B60D 1/488

FOREIGN PATENT DOCUMENTS

| | | |
|---|---|---|
| DE | 102013020425 A1 | 6/2015 |
| DE | 102019201154 A1 | 8/2019 |
| JP | S5795263 A | 6/1982 |

OTHER PUBLICATIONS

German Search Report for Application No. DE 10 2023 202 106.4, dated Oct. 27, 2023.

* cited by examiner

*Primary Examiner* — Minnah L Seoh
*Assistant Examiner* — Al-Birr Rahman Chowdhury
(74) *Attorney, Agent, or Firm* — Jordan IP Law, LLC; Todd A. Vaughn

(57) ABSTRACT

A tow hook device for a motor vehicle, that includes a base plate, a hook, and a buckling bracket. The hook has a free end and a fastening end opposing the free end. The hook is fastened to the base plate at the fastening end such that, in an installation position, it orients the hook obliquely to the base plate in a vertical direction. The buckling bracket connects the free end to the base plate such that, in the side view, forms a second angle to the base plate that is closer to 90 degrees than the first angle so that the base plate, the hook, and the buckling bracket form a triangle in the side view. The buckling bracket is formed of a deformable material to enable deformation of the buckling bracket in response to a predefined pressure from the free end.

19 Claims, 1 Drawing Sheet

TOW HOOK DEVICE

CROSS-REFERENCE TO RELATED APPLICATIONS

The present application claims priority under 35 U.S.C. § 119 to German Patent Publication No. DE 102023202106.4 (filed on Mar. 9, 2023), which is hereby incorporated by reference in its complete entirety.

TECHNICAL FIELD

One or more embodiments of the present disclosure relates to a tow hook device for a motor vehicle, and a motor vehicle comprising a tow hook device of this type.

BACKGROUND

Tow hooks on motor vehicles are known per se. Tow hooks are conventionally positioned at the front of a vehicle (occasionally referred to as the "A surface") and are formed in such a way that, for example, a tow rope can be fastened to the tow hook in order for example to tow the vehicle away. Tow hooks of this type may also be provided on off-road vehicles and may form off-road towing systems on such vehicles.

Tow hooks are typically configured so as to be very sturdy, and are therefore often made of steel. Conventional towing systems are rigid constructions which tolerate tensile forces corresponding to or more than the total weight of the vehicle. In order to be able to employ such high forces, the constructions are highly rigid and may therefore cause damage to the attached structure in the event of an impact, for example a mild collision or impact with an obstacle. In order to avoid high repair costs in the event of such damage, the tow hook must be constructed in such a way that tensile forces can be withstood without cracking or severe deformation on the one hand, while the impact forces, i.e., compressive forces, must be absorbed without causing considerable damage to the motor vehicle on the other.

SUMMARY

One or more embodiments of the present disclosure are to specify a tow hook device for a motor vehicle which makes it possible to tow the motor vehicle reliably and mitigate an impact force on the tow hook, for example, when the tow hook impacts an object, in such a way that damage to the motor vehicle is avoided. A further object of the present disclosure is to specify a motor vehicle with a reliable tow hook device of this type which protects the motor vehicle.

In accordance with one or more embodiments, a tow hook device for a motor vehicle, comprises a base plate; U-shaped hook fastened to the base plate at a fastening end of the hook such that, in an installation position, the hook is oriented obliquely to the base plate in a vertical direction so that in a side view a connecting line between the fastening end and a free end, opposing the fastening end, of the hook encloses a first angle to the base plate which is not 90 degrees; a buckling bracket which connects the free end of the hook to the base plate and which, in the side view, encloses a second angle to the base plate which is closer to 90 degrees than the corresponding first angle of the hook so that the base plate, the hook and the buckling bracket forming a triangle in the side view, the buckling bracket being formed to be less robust than the hook in order that the buckling bracket is deformed in an event of a predefined pressure from the free end of the hook.

In accordance with one or more embodiments, a hook, which can also be referred to as a "towing bracket," is mounted on a base plate which can be supported by a structure, for example, a profile or a panel of the motor vehicle. The hook device is formed in such a way that the structure of the motor vehicle can bend under compressive load when a particular load level is reached, but it withstands tensile load, for example, when towing, without cracking or significant plastic deformation.

For this purpose, the tow hook device has a U-shaped hook which is fastened to a base plate, such that the hook is oriented obliquely to the base plate and such that the hook is not oriented horizontally in the installation position, i.e., is not parallel to the vehicle floor. The free end of the hook, a hook end portion, on which the connecting bracket of the U-shape is formed, is connected to the base plate via at least one bracket or a strut, in addition to the connection formed by the hook itself, wherein the strut is adapted to deform, i.e., bend or buckle, in the event of a defined compressive load, and is therefore referred to herein as a "buckling bracket."

The buckling bracket is formed so as to be less robust than the hook. The buckling bracket may in particular have a smaller cross section than the hook and/or be manufactured from a less robust material than the hook and/or have at least one predetermined buckling point, i.e., at least one region which is formed so as to be less robust than other regions of the buckling bracket.

In the side view, the buckling bracket encloses a second angle to the base plate which is closer to 90 degrees than the corresponding first angle of the hook, so that the base plate, the hook and the buckling bracket form a triangle in the side view.

In the event of external pressure against the hook, the hook is then swiveled towards the base plate and presses against the buckling bracket in such a way that, in the event of a predefined pressure from the free end of the hook, the buckling bracket is pressed towards the base plate by the swiveling movement of the hook and is deformed in the process.

In the event of a tensile load, the hook is drawn away from the base plate and the buckling bracket is also drawn away with it. The buckling bracket thus contributes to the rigidity of the tow hook in the event of a tensile load. The tow hook device is therefore sufficiently rigid, for example, to enable the motor vehicle to be towed reliably, and is able to mitigate an impact force on the tow hook, for example when the tow hook impacts an object, in such a way that damage to the motor vehicle is avoided.

It is therefore possible to fold the hook towards the base plate if necessary. The foldable tow hook, in particular the off-road tow hook, is able to avoid damage to the main structures of the motor vehicle, such as the subframe and body, to a certain extent. The tow hook itself may be replaceable, thus ensuring low repair costs. The tow hook device can for example be replaced in a simple manner in the event of damage. In addition, the base plate of the tow hook may be designed in such a way that it also contributes to the stiffness of the front end and can be employed to fasten other components, for example, a profile such as a bumper.

In accordance with one or more embodiments, it is preferable both aforementioned angles, i.e., the first angle and the second angle, are greater than 90 degrees so that, in the installation position, the hook and the buckling bracket are directed downwards away from the base plate, or both aforementioned angles are less than 90 degrees so that, in the installation position, the hook and the buckling bracket are directed upwards away from the base plate. In the event of appropriate pressure acting on the hook, the buckling bracket is then pressed under or behind the hook towards the base plate.

In accordance with one or more embodiments, it is preferable the first angle is between 120 degrees and 160 degrees and/or the second angle is between 90 degrees and 130 degrees. It is particularly preferable the second angle is between 95 degrees and 120 degrees.

In accordance with one or more embodiments, it is preferable the tow hook device comprises at least two buckling brackets, wherein in each case at least one buckling bracket connects each leg of the free end of the hook to the base plate. In this way, separate a left buckling bracket and a right buckling bracket may be formed. The left buckling bracket and the right buckling bracket may, however, also be formed in one piece or so as to be interconnected. In this case, in the side view, both the left buckling bracket and the right buckling bracket preferably enclose a second angle to the base plate which is closer to 90 degrees than the corresponding first angle of the respective leg of the hook so that the base plate, the respective leg of the hook and the respective buckling bracket forming a triangle in the side view.

At least one of the buckling brackets may be geometrically formed in such a way that deformation of the buckling bracket is facilitated in the event of pressure from the free end of the hook, in particular because a predetermined buckling point is created or formed in the buckling bracket.

In accordance with one or more embodiments, it is preferable a U-shaped hook end portion is formed at the free end of the hook, i.e., the tow hook in the narrower sense, wherein, in the side view, the hook end portion is oriented so as to be normal to the base plate and/or is oriented horizontally in the installation position in a motor vehicle, i.e., parallel to the carriageway.

In accordance with one or more embodiments, it is preferable the hook, at the fastening end thereof, and/or the buckling bracket, at the fastening end thereof, on the base plate has a fastening end portion which is oriented parallel to the base plate and contacts the base plate. The hook and/or the buckling bracket may be fastened, for example welded, to the base plate along this fastening end portion. The fastening end portion(s) of the hook may be directed upwards in the installation position and/or the fastening end portion(s) of the buckling bracket may be directed downwards in the installation position.

The motor vehicle in accordance with one or more embodiments has a tow hook device of this type, in which the base plate may be fastened to a body component and/or to a frame component, in particular, to a subframe, of the motor vehicle. Preferably, the base plate is fastened both to the body component and to the frame component and thus connects the body and the frame, in particular the subframe. The base plate is preferably oriented vertically in the vehicle, i.e., normal to the carriageway.

BRIEF DESCRIPTION OF THE DRAWINGS

The one or more embodiments of this disclosure will be illustrated by way of example in the drawings and explained in the description hereinbelow.

DESCRIPTION

Figure 2:
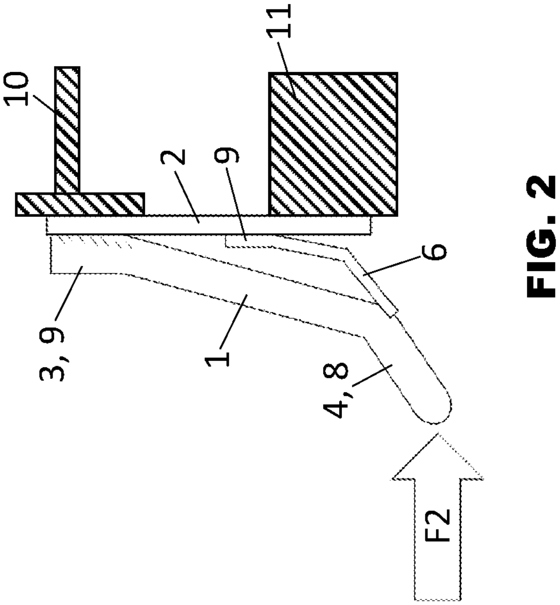
FIG. 2 shows a side view of the tow hook device of FIG. 1, in a second load case, namely in the event of a compressive load.
Figure 1:
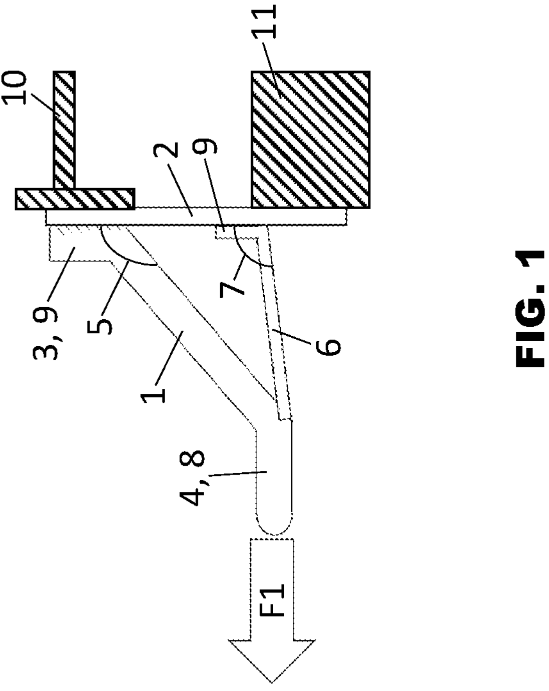
FIG. 1 shows a side view of a tow hook device fastened to a motor vehicle, in a first load case, namely in the event of a tensile load, in accordance with one or more embodiments.

FIGS. 1 and 2 show a tow hook device in accordance with one or more embodiments. FIG. 1 shows the tow hook device in the ordinary state thereof, in which the buckling bracket 6 is not buckled or bent, for example, in the event of a tensile load applied by a tensile force F1, or also without any forces acting on the hook 1. In contrast, FIG. 2 shows a state of the tow hook device in the event of a compressive load, in which a compressive force F2 acts on the hook 1 and a buckling bracket 6 is buckled.

The tow hook device comprises a U-shaped hook 1 or towing bracket, which, at a free end 4, opposing a vertical base plate 2, of the hook 1, has a U-shaped hook end portion 8, i.e., the tow hook in a narrower sense. In the ordinary state, when there is no high compressive load acting on the hook 1 (as shown in FIG. 1), the hook end portion 8 is oriented so as to be normal to the base plate 2 in the side view, i.e., horizontally oriented. The hook 1 is fastened, for example, welded, to the base plate 2 at a fastening end 3 of the hook 1.

In the installation position, the hook 1 is oriented obliquely to the base plate 2 in the vertical direction, namely obliquely downwards in the configuration shown, so that in a side view the connecting line between the fastening end 3 and the free end 4, opposing the fastening end 3, of the hook 1 encloses or forms a first angle 5 to the base plate 2 which is not 90 degrees.

The tow hook device additionally comprises a buckling bracket 6 which connects the free end 4 of the hook 1 to the base plate 2 and which, in the side view, encloses or forms a second angle 7 to the base plate 2 which is closer to 90 degrees than the corresponding first angle 5 of the hook 1, so that the base plate 2, the hook 1 and the buckling bracket 6 together form a triangle in the side view (as shown in FIG. 1).

The buckling bracket 6 is formed so as to be less robust than the hook 1 so that, in the event of a predefined pressure F2 from the free end 4 of the hook 1 towards the base plate 2, the buckling bracket 6 is deformed, as shown in FIG. 2.

The first angle 5 and the second angle 7 are both greater than 90 degrees so that, in the installation position, the hook 1 and the buckling bracket 6 are directed away from the base plate 2 in the same direction, namely downwards in this case.

The tow hook device comprises two buckling brackets 6 (not visible in the side view shown in FIGS. 1 and 2), in which in each case a buckling bracket 6 connects each leg of the free end 4 of the hook 1 to the base plate 2. Since the hook 1 has two legs, two buckling brackets 6 are also provided to connect the legs to the base plate 2. The hook 1 and the buckling bracket 6, at the fastening ends 3 thereof which are used for fastening to the base plate 2, each have a fastening end portion 9 which is oriented parallel to the base plate 2, rests against the base plate 2 and is fastened to the latter.

The base plate 2 is fastened to a body component 10 and to a frame component 11, namely to a subframe of the motor vehicle, so that the body component 10 and the frame component 11 are interconnected via the base plate 2. Further vehicle components may also be fastened to the base plate 2.

The tow hook according in accordance with one or more embodiments is able to bear loads in a plurality of directions without significant plastic deformation or the formation of cracks. For example, in the towing load case, i.e., when a tensile force F1 is applied (FIG. 1), the towing system can accommodate defined forces without visible permanent deformation or fracture.

In the event of compressive loads, such as an accident, i.e., when a compressive force F2 is applied (FIG. 2), the tow hook can give way when a particular load level is reached. For this purpose, the buckling bracket can be designed to collapse in the event of a compressive force F2 so that neither the body 10 nor the subframe 11 are damaged. For this purpose, as a variant, the buckling bracket may be geometrically formed in such a way that a predetermined buckling point is created. This is achieved by attaching, in particular, welding, a hook 1 to a base plate 2. A buckling structure, namely the buckling bracket 6, is designed in such a way that the buckling bracket 6 provides improved support in the event of a tensile force F1, so that no damage or plastic deformation of the hook 1 occurs. In the event of a defined compressive force F2, the structure, namely the buckling bracket(s) 6, buckles so that the buckling bracket 6 deforms in a defined manner.

The base plate 2 may be fastened to the subframe 11 or to the body 10, or to both, in order to produce a reinforcing connection. The base plate 2, subframe 11 and body 10 may be fastened with bolts. This ensures that repairs can be performed in a simple manner following damage.

LIST OF REFERENCE SYMBOLS

- 1 hook
- 2 base plate
- 3 fastening end
- 4 free end
- 5 first angle
- 6 buckling bracket
- 7 second angle
- 8 hook end portion
- 9 fastening end portion
- 10 body component
- 11 frame component
- F1 tensile force
- F2 compressive force

What is claimed is:

1. A tow hook device for a motor vehicle, the tow hook device comprising:

a base plate having a surface oriented vertically in the motor vehicle;

a U-shaped hook having a free hook end and a fastening hook end opposing the free hook end, the hook being fastened to the surface of the base plate at the fastening hook end such that, in an installation position, orients the hook obliquely to the base plate in a vertical direction so that a connecting line between the free hook end and the fastening hook end forms a first angle which is not 90 degrees to the base plate; and a buckling bracket directly connected to free hook end and the surface of the base plate to connect the free hook end to the base plate and thereby form a triangle with the base plate and the hook, the buckling bracket forming a second angle to the base plate that is closer to 90 degrees than the first angle, the buckling bracket being formed of a deformable material to enable deformation of the buckling bracket towards the surface of the base plate in response to receipt of a predefined compressive force from the free hook end.

2. The tow hook device of claim 1, wherein the first angle and the second angle are greater than 90 degrees so that, in the installation position, the hook and the buckling bracket are directed downwardly away from the base plate.

3. The tow hook device of claim 1, wherein the first angle and the second angle are less than 90 degrees so that, in the installation position, the hook and the buckling bracket are directed upwardly away from the base plate.

4. The tow hook device of claim 1, wherein:

the first angle is in a range between 120 degrees and 160 degrees, and/or the second angle is in a range between 95 degrees and 120 degrees.

5. The tow hook device of claim 1, wherein:

a hook end portion at the free hook end of the hook has a U-shape, the hook end portion, in the side view, is oriented normal to the base plate, and/or the hook end portion, in the side view, is oriented horizontally in the installation position.

6. The tow hook device of claim 1, wherein on the base plate:

the hook, at the fastening hook end thereof, has a fastening hook end portion which is oriented parallel to the base plate and contacts the base plate, and/or the buckling bracket has a fastening hook end portion which is oriented parallel to the base plate and contacts the base plate.

7. A motor vehicle, comprising:

a body component;

a frame component; and a tow hook device that includes:

a base plate fastened to the body component and the frame component, the based plate having a surface oriented vertically in the motor vehicle;

a U-shaped hook having a free hook end oriented normal to surface of the base plate and a fastening hook end opposing the free hook end, the hook being fastened to the surface of the base plate at the fastening hook end such that, in an installation position, orients the hook obliquely to the base plate in a vertical direction so that a connecting line between the free hook end and the fastening hook end forms a first angle which is not 90 degrees to the base plate; and a buckling bracket directly connected free hook end and to the surface of the base plate to connect which connects the free hook end to the base plate and thereby form a triangle with the base plate and the hook, the buckling bracket forming such that, in the side view, forms a second angle to the base plate that is closer to 90 degrees than the first angle, the buckling bracket being formed of a deformable material to enable deformation of the buckling bracket towards the surface of the base plate in response to receipt of a predefined compressive force from the free hook end.

8. The motor vehicle of claim 7, wherein the first angle and the second angle are greater than 90 degrees so that, in the installation position, the hook and the buckling bracket are directed downwardly away from the base plate.

9. The motor vehicle of claim 7, wherein the first angle and the second angle are less than 90 degrees so that, in the installation position, the hook and the buckling bracket are directed upwardly away from the base plate.

10. The motor vehicle of claim 7, wherein:

the first angle is in a range between 120 degrees and 160 degrees, and/or the second angle is in a range between 95 degrees and 120 degrees.

11. The motor vehicle of claim 7, wherein:

a hook end portion at the free hook end of the hook has a U-shape, the hook end portion, in the side view, is oriented normal to the base plate, and/or the hook end portion, in the side view, is oriented horizontally in the installation position.

12. The motor vehicle of claim 7, wherein on the base plate:

the hook, at the fastening hook end thereof, has a fastening hook end portion which is oriented parallel to the base plate and contacts the base plate, and/or the buckling bracket, has a fastening hook end portion which is oriented parallel to the base plate and contacts the base plate.

13. A tow hook device for a motor vehicle, the tow hook device comprising:

a base plate having a surface oriented vertically in the motor vehicle;

a hook fastened to the surface of the base plate at a fastening hook end which opposes a free hook end that, in an installation position, is oriented normal to the base plate; and at least two buckling brackets, formed of a deformable material to enable deformation of the at least two buckling brackets in a direction towards the surface of the base plate in response to receipt of a predefined compressive force from the free hook end, the buckling bracket being directly connected at one end thereof to the surface of the base plate and an opposite end thereof to the free hook end to connect the free hook end to the base plate and thereby form a triangle with the base plate and the hook.

14. The tow hook device of claim 13, wherein the first angle and the second angle are greater than 90 degrees so that, in the installation position, the hook and the at least two buckling brackets are directed downwardly away from the base plate.

15. The tow hook device of claim 13, wherein the first angle and the second angle are less than 90 degrees so that, in the installation position, the hook and the at least two buckling brackets are directed upwardly away from the base plate.

16. The tow hook device of claim 13, wherein:

the first angle is in a range between 120 degrees and 160 degrees, and/or the second angle is in a range between 95 degrees and 120 degrees.

17. The tow hook device of claim 13, wherein:

a hook end portion at the free hook end of the hook has a U-shape, the hook end portion, in the side view, is oriented normal to the base plate, and/or the hook end portion, in the side view, is oriented horizontally in the installation position.

18. The tow hook device of claim 13, wherein on the base plate:

the hook, at the fastening hook end thereof, has a fastening hook end portion which is oriented parallel to the base plate and contacts the base plate, and/or the at least two buckling brackets has a fastening hook end portion which is oriented parallel to the base plate and contacts the base plate.

19. The tow hook device of claim 13, wherein:

at least one buckling bracket of the at least two buckling brackets is configured to connect each leg of the free hook end of the hook to the base plate, and at least one buckling bracket of the at least two buckling brackets is formed geometrically to have at least one predetermined buckling point which facilitates deformation of the at least one buckling bracket in response to the predefined pressure from the free hook end of the hook.

* * * * *